United States Patent [19]

Ardueser et al.

[11] Patent Number: 4,969,315
[45] Date of Patent: Nov. 13, 1990

[54] STRUCTURE FOR GUIDING SURFACE WRAP INTO A BALE CHAMBER

[75] Inventors: William A. Ardueser, Ottumwa, Iowa; Jean Viaud, Sarreguemines, France

[73] Assignee: Deere & Company, Moline, Ill.

[21] Appl. No.: 328,217

[22] Filed: Mar. 24, 1989

[51] Int. Cl.⁵ ............................................. B65B 11/04
[52] U.S. Cl. ........................................ 53/587; 53/389
[58] Field of Search ................. 53/118, 587, 389, 176; 226/171

[56] References Cited

U.S. PATENT DOCUMENTS

| | | | |
|---|---|---|---|
| 3,176,352 | 4/1965 | Ricklin | 226/171 |
| 3,387,429 | 6/1968 | Peabody | 53/389 X |
| 3,478,486 | 11/1969 | Treiber | 53/389 X |
| 4,676,046 | 6/1987 | Verhulst | 53/118 |
| 4,697,402 | 10/1987 | Anstey | 53/389 |

Primary Examiner—John Sipos

[57] ABSTRACT

A wrap material guide assembly is positioned beneath a run of each of a plurality of bale-forming belts extending between a lower rear and a lower front roll carried by a discharge gate of a large round baler. The guide assembly includes a guide member including a plurality of relatively narrow slats that are each in engagement with the bottom of a respective one of the bale-forming belt runs. The rear ends of the slats are fixed to a panel that extends transversely beneath and extends behind the lower rear roll and serves to intercept the leading edge of wrap material being fed by feed rolls and to direct the material to a pinch point defined between the panel and the bale-forming belts so that the belts grip and carry the material along the slats and into a bale chamber inlet located just forwardly of the front roll. The front of the slats are fixed to a cross member that is fixed to a belt guide structure positioned adjacent the front roll.

13 Claims, 4 Drawing Sheets

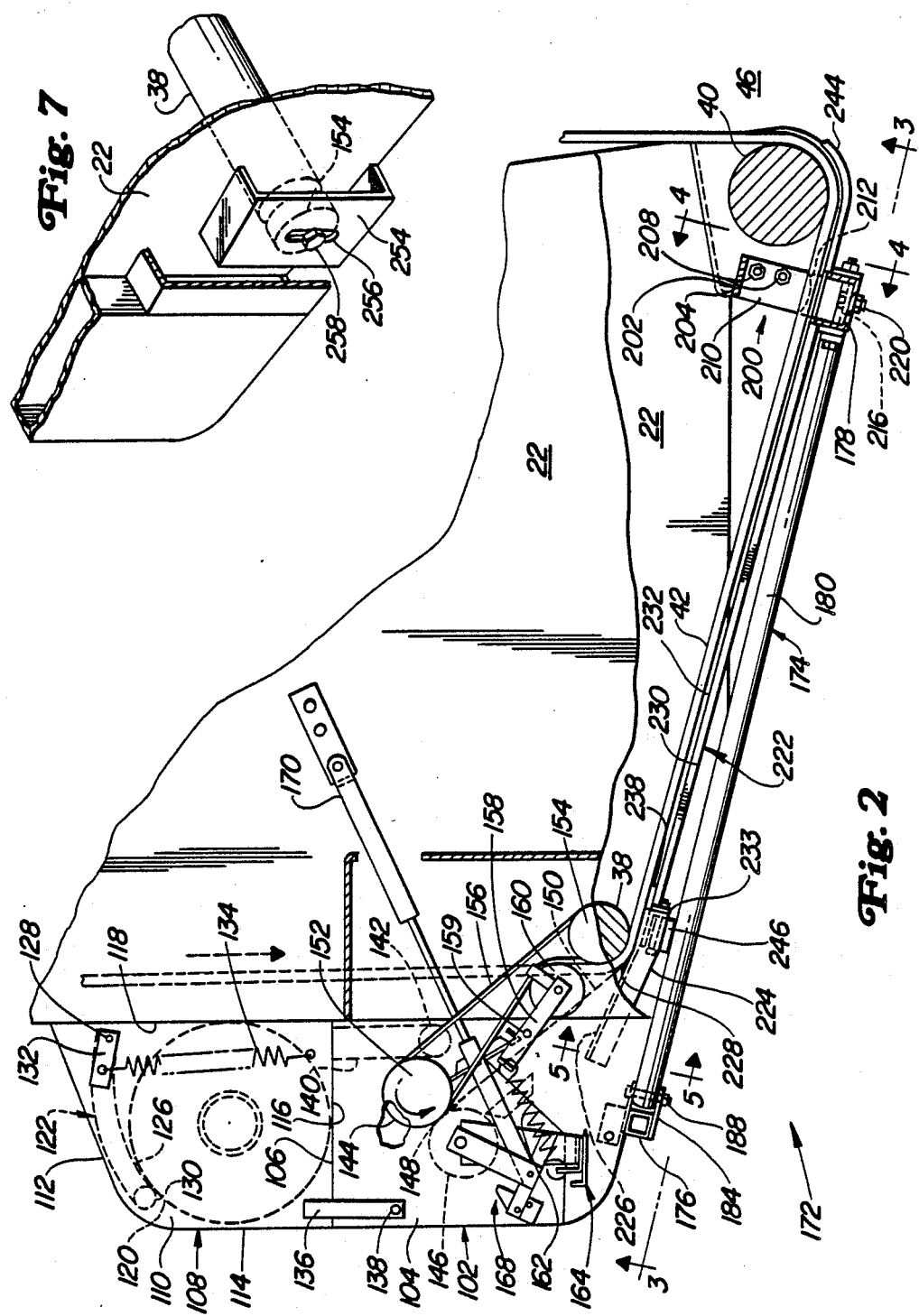

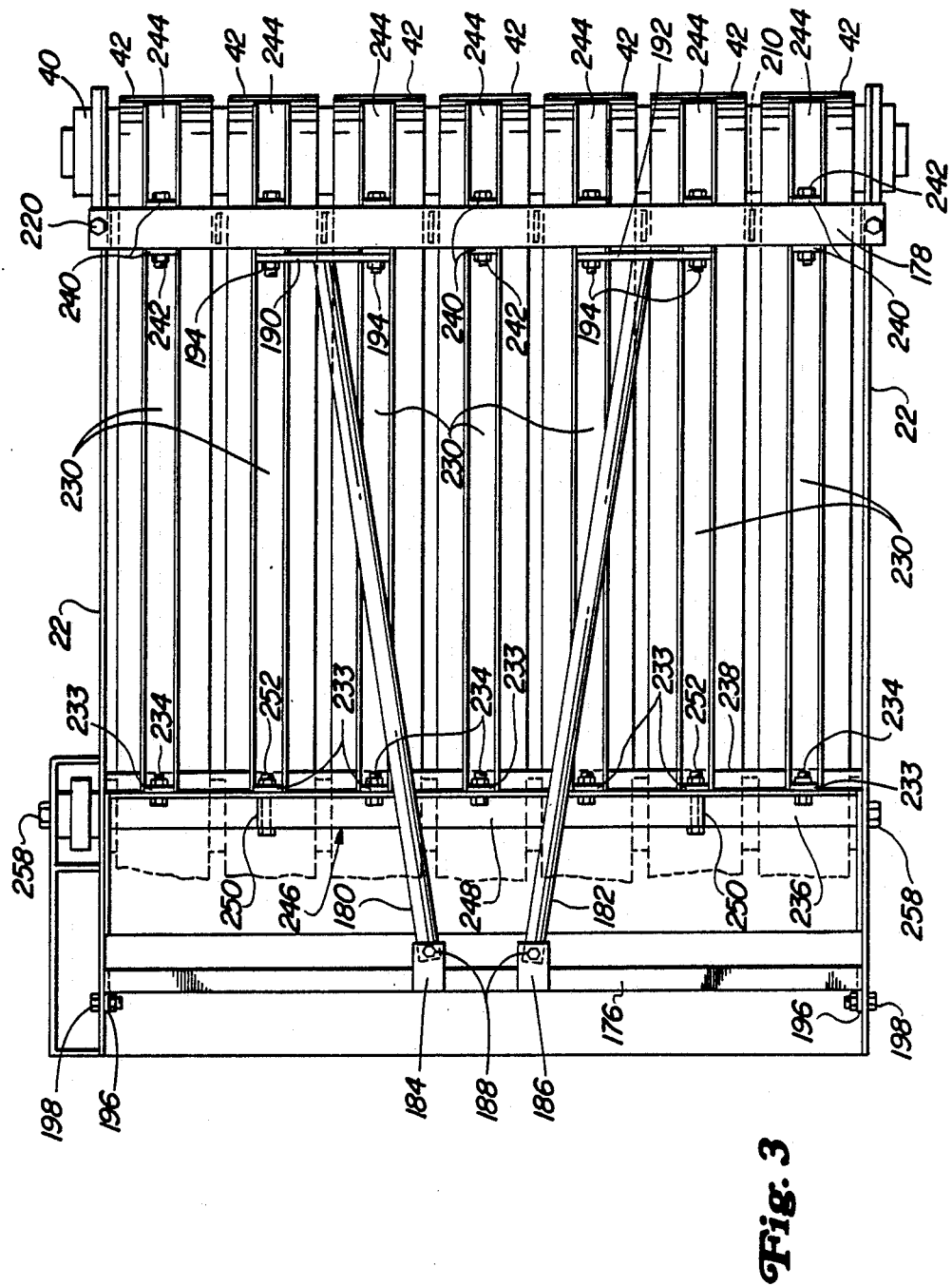

STRUCTURE FOR GUIDING SURFACE WRAP INTO A BALE CHAMBER

BACKGROUND OF THE INVENTION

The present invention relates to apparatus for feeding web material into the inlet of a bale chamber of a large round baler for wrapping a cylindrical bale formed in the chamber and more specifically relates to structure for guiding such material beneath a discharge gate portion of an expansible bale chamber defined by a plurality of belts mounted side-by-side on fixed and movable rolls arranged to define a crop inlet forwardly of a run of the belts extending between lower rear and front fixed rolls carried by the discharge gate.

U.S. Pat. No. 4,676,046 issued to Verhulst et al on 30 June 1987 discloses a web material feeding apparatus of the type to which the present invention pertains. In the patented design, the guiding structure includes a sheet metal pan mounted beneath and in engagement with the run of belts extending between the lower rear and front rolls carried by the discharge gate so that when an end of a roll of web material is fed to a pinch point formed between the run of belts and the guide pan at a location adjacent the lower rear roll, the belts engage and carry the material forwardly along the surface of the guide pan. The guide pan terminates rearwardly of the lower front belt support roll and a plurality of guide fingers are supported at the forward end of the pan, occupy gaps between adjacent belts and are curved about the front support roll so as to guide the web of wrap material into the bale chamber inlet and to serve as belt guides.

It has been found that the guide pan does not function entirely satisfactorily since crop materials tend to accumulate on the pan and sometimes impede the movement of the web of wrap material to the bale chamber inlet to the extent that the wrap material bunches up on the pan and requires the baler to be stopped to clean the accumulation of crop material off the pan and to straighten out the accumulation of wrap material.

Another problem with the guide pan is that it obstructs the view of the gaps between adjacent belts of the run of belts extending between the lower rear and front belt support rolls, and hence is an impediment to one trying to determine whether an adjustment needs to be made to the lower rear roll to make the belts track in a more centered fashion across the lower front roll.

SUMMARY OF THE INVENTION

According to the present invention there is provided an improved structure for guiding a web of surface wrap beneath a bale discharge gate and into an inlet in the bottom of a belt-formed bale chamber, and more specifically there is provided a surface wrap guide structure which is an improvement over the guide structure disclosed in the aforementioned U.S. Pat. No. 4,676,046.

An object of the invention is to provide a surface wrap material guide structure which extends beneath and is in contact with a run of bale chamber forming belts extending between and supported by lower rear and front support rolls carried by a bale discharge gate but which is constructed such that crop material falling between gaps of adjacent belts does not accumulate on the structure.

A further object of the invention is to provide a surface wrap material guide structure arranged on a bale discharge gate in the manner set forth in the previous object, but being constructed to permit clear view of the gaps between adjacent belts of the run extending between the lower rear and front belt support rolls so as to determine whether the run of belts is tracking properly.

These and other objects, features and advantages of the present invention will become apparent to those skilled in the art from the description which follows and from the drawings.

BRIEF DESCRIPTION OF THE DRAWINGS

FIG. 2 is an enlarged right side elevational view of that portion of the baler shown in FIG. 1 to which the wrapping mechanism is mounted and showing side shielding removed from the support frame and housing.

FIG. 3 is a view taken along line 3—3 of FIG. 2 showing the bottom of the surface wrap guide structure.

FIG. 7 is a right front perspective view of the right end portion of the lower rear guide roll for the bale-forming belts of the baler and showing a connection adjustably connecting the right end of the roll to the right sidewall of the discharge gate of the baler.

DESCRIPTION OF THE PREFERRED EMBODIMENT

Initially, it is to be noted that various components are described herein as existing in pairs while only one of each pair is shown. It is to be understood that the unshown component is the same as or similar to the one shown.

Figure 1:
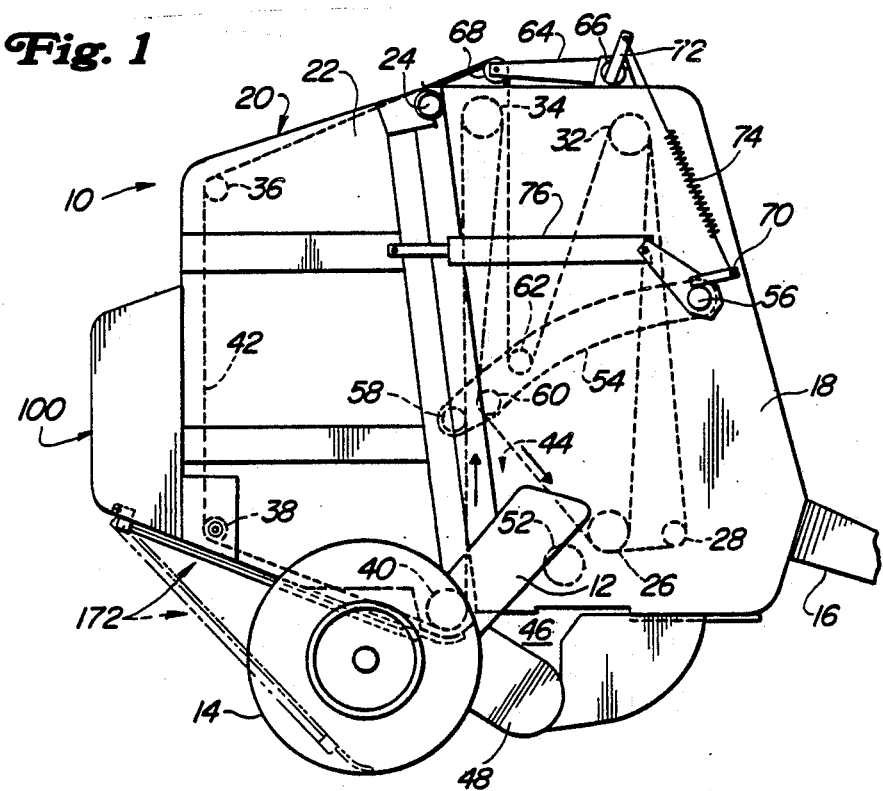
FIG. 1 is a somewhat schematic, right side elevational view of a large round baler equipped with a wrapping mechanism having a surface wrap guide structure constructed in accordance with the present invention.
Figure 6:
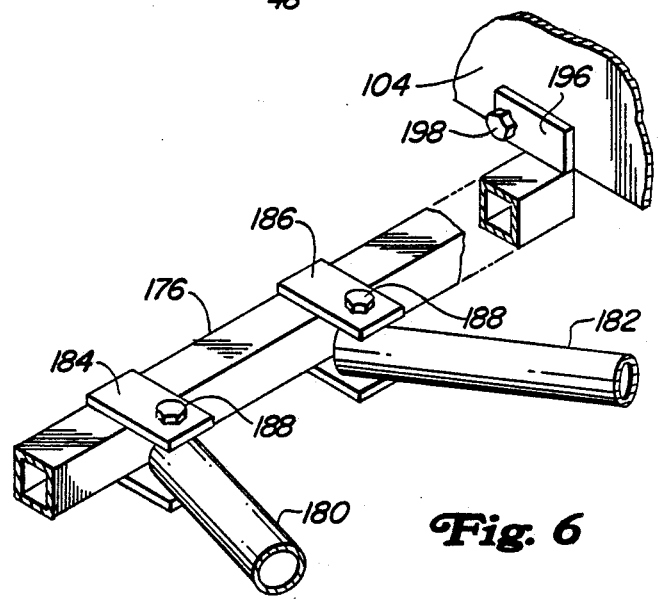
FIG. 6 is a right front perspective view of a rear portion of the frame of the wrap material guide structure.

Referring now to FIG. 1, there is shown a large round baler 10 including a main frame 12 supported on a pair of ground wheels 14 and having a draft tongue 16 secured thereto and adapted for connection to a tractor. A pair of transversely spaced vertical sidewalls 18 is joined to the frame 12 and have respective upright rear ends. A bale discharge gate 20 including opposite sidewalls 22 is vertically pivotally attached, as at 24, to upper rear locations of the sidewalls 18, the sidewalls 22 having forward ends which mate with the rearward ends of the sidewalls 18 when the gate is in a lowered closed position as shown.

The pairs of sidewalls 18 and 22 rotatably support the opposite ends of a plurality of bale-forming belt support rolls adjacent the periphery of the sidewalls. Specifically, beginning at lower central location of the sidewalls 18 and proceeding counterclockwise there are mounted a driven roll 26, a lower front roll 28, an upper front roll 32 and an upper rear roll 34; and continuing counterclockwise from an upper rear location of the gate sidewalls 22 there is mounted an upper rear roll 36, a lower rear roll 38 and a lower front roll 40. A plurality of endless bale-forming belts 42 are spaced one from the other across the space between the opposite pairs of sidewalls 18 and 22. Except for some of the belts 42 which skip the lower front roll 28, the belts are trained so that they serially engage the rolls 26, 28, 32, 36, 38, 40 and 34. The belts cooperate with the sidewalls to define a bale-forming chamber 44 having an inlet 46 located between the rolls 26 and 40 and into which crop products are introduced by a pickup 48 for being rolled into a bale by the action of the belts 42 and initially also by a starter roll 52 rotatably mounted in the sidewalls 18 adjacent the driven roll 26. As the bale is being formed, the chamber 44 yieldably expands against the force established in the belts 42 by a tensioning system including a pair of tensioning arms 54 vertically pivotally mounted, as at 56, to a central front location of the sidewalls 18, with the arms carrying a pair of closely spaced rolls 58 and 60 between which are located respective runs of the belts 42 extending between the roll 34 and the rolls 26 and 40 whereby the rolls 58 and 60 close the top of the bale-forming chamber 44. Another roll 62 is carried by the arms 54 and engages an upper side of a run of the belts 42 extending between the rolls 32 and 36. A further pair of belt tensioning arms 64 is vertically pivotally mounted, as at 66, to an upper central location of the sidewalls 18 and carry a roll 68 engaged with the underside of the run of belts 42 extending between the rolls 32 and 36. Respectively coupled for rotation with the pairs of arms 54 and 64 are pairs of arms 70 and 72. Coupled between the arms 70 and 72 at each side of the baler is a tension spring 74 which acts to bias the arms 64 clockwise so as to take up slack and maintain tension in the belts 42. A gate cylinder 76 is connected between each arm 54 and the gate 20, the cylinders being connected in a hydraulic system (not shown), containing pressure relief valving which open in response to a predetermined system pressure, as would be caused by a bale growing in the bale-forming chamber 44, the release of fluid through the valving allowing the cylinders to extend and the arms 54 to raise to thereby expand the chamber 44.

A wrapping mechanism 100 for enveloping a bale formed in the chamber 44 with a web of wrapping material is mounted to the rear of the gate 20. Referring now also to FIG. 2, it can be seen that the wrapping mechanism 100 includes a frame 102 including opposite vertical sidewalls 104 provided with forward vertical flanges bolted or otherwise secured to corresponding flanges forming vertical rear ends of the gate sidewalls 22. Tops of the sidewalls 104 are defined by horizontal flanges 106. A wrap material housing 108 has opposite sidewalls 110 joined together by a downwardly sloping top wall 112, a vertical rear wall 114 and a horizontal bottom wall 116 which terminates short of the front of the housing for defining a wrap material passage between the bottom wall and a vertical panel 118 extending between and fixed to the gate sidewalls 22 and closing the front end of the housing 108. Resting on the bottom 116 of the housing 108 is a wrap material supply roll 120 which is biased by a U-shaped structure 122 toward a lower forward corner of the housing. The U-shaped structure 122 includes a pair of arms 126 having respective forward ends pivotally mounted, as at 128, to upper forward locations of the opposite sidewalls 110 and having rear ends joined by a crossbar 130 which engages an upper rear area of the roll of wrap material. A rearwardly projecting arm 132 is mounted to one of the arms 126 at the pivot 128 and a spring 134 is coupled between the arm 132 and the housing sidewall so as to urge the crossbar 130 against the roll of wrap material. The housing 108 is mounted to the opposite sidewalls 104 of the frame 102 by a pair of vertical straps 136 depending from lower rear locations of the housing and having their lower ends pivotally attached, as at 138, to the opposite sidewalls. Thus, the housing 108 may be pivoted rearwardly about the pivots 138 to dispose the housing in a lowered position for receiving a new roll of wrap material once the roll 120 has been depleted.

A pair of spreader roll support legs 140 is secured to and depend from inner front locations of the housing sidewalls 110. Extending between and rotatably mounted to the bottom of the legs 140 is a wrap material spreader roll 142 comprising a cylindrical roll having spiral flighting (not shown) at opposite ends thereof of opposite hand whereby the flighting acts to "feed" wrap material engaged therewith toward the opposite sidewalls 104. When the housing 108 is in a closed, dispensing position, as shown, the spreader roll 142 is disposed for rotation about an axis located forwardly of and below an axis of rotation of a forward wrap material feed roll 144 which is rotatably supported in the opposite sidewalls 104. A rear wrap material feed roll 146 is rotatably supported in the sidewalls 104 at a location below and rearwardly of the axis of rotation of the front feed roll 144. The feed rolls 144 and 146 include elastomeric surfaces which are in frictional engagement with each other so as to define a pinch point 148 for gripping wrap material fed therebetween. After a new roll of wrap material has been loaded into the housing 108, when the latter is in its open position, a length of wrap material 150 is pulled from the supply roll 120 and placed over the spreader roll 142 and manually fed into the feed rolls 144 and 146. The housing 108 is then closed resulting in the length of wrap material 150 being tightly wrapped about approximately three-fourths of the periphery of the feed roll 144. The right-hand end of the feed roll 144 has a pulley 152 integral therewith. Similarly, a pulley 154 is integral with the right end of the lower rear belt support roll 38. A drive belt 156 is received about the pulleys 152 and 154. An idler arm 158 is pivotally mounted, as at 159, to the frame right sidewall 104 and carries an idler pulley 160 at its forward end. A spring 162 is connected between the rear end of the arm 158 and a cut-off knife structure 164 and acts to bias the pulley 160 into tensioning engagement with the belt 156 when a pivoted knife carrying arm of the structure 164 held in a rearwardly cocked position, as shown in FIG. 2, by a releasable latch mechanism 168 which is selectively releasable by actuation of a hydraulic cylinder 170 connected between the latch mechanism and the right discharge gate sidewall 22. Details of the latch mechanism structure and operation are omitted for the sake of brevity but are available in U.S. Pat. No. 4,697,402 granted 6 Oct. 1987.

Figure 4:
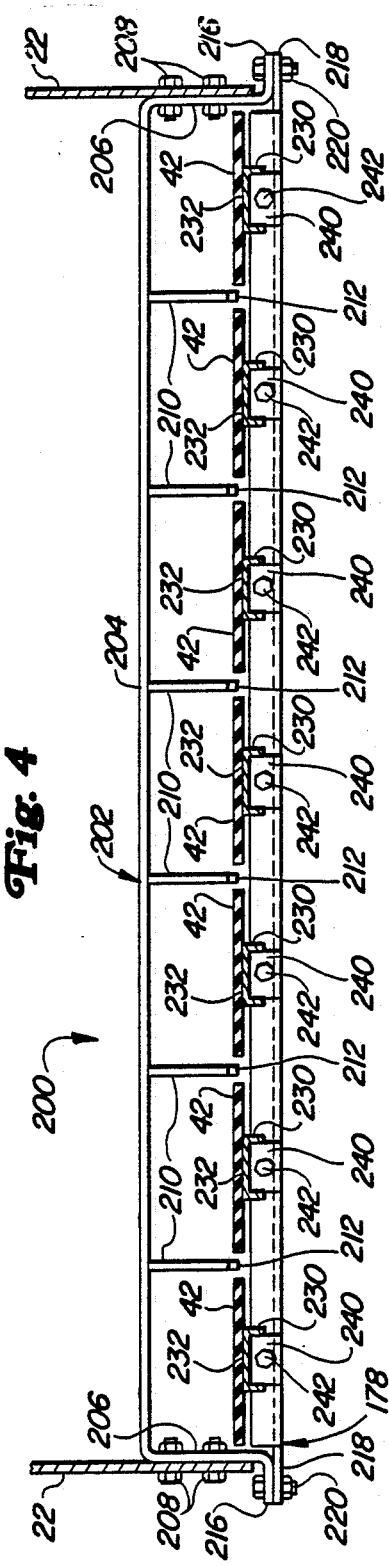
FIG. 4 is a view taken along line 4—4 of FIG. 2 showing a belt guide structure mounted to the gate sidewalls and supporting one end of the surface wrap guide structure.
Figure 5:
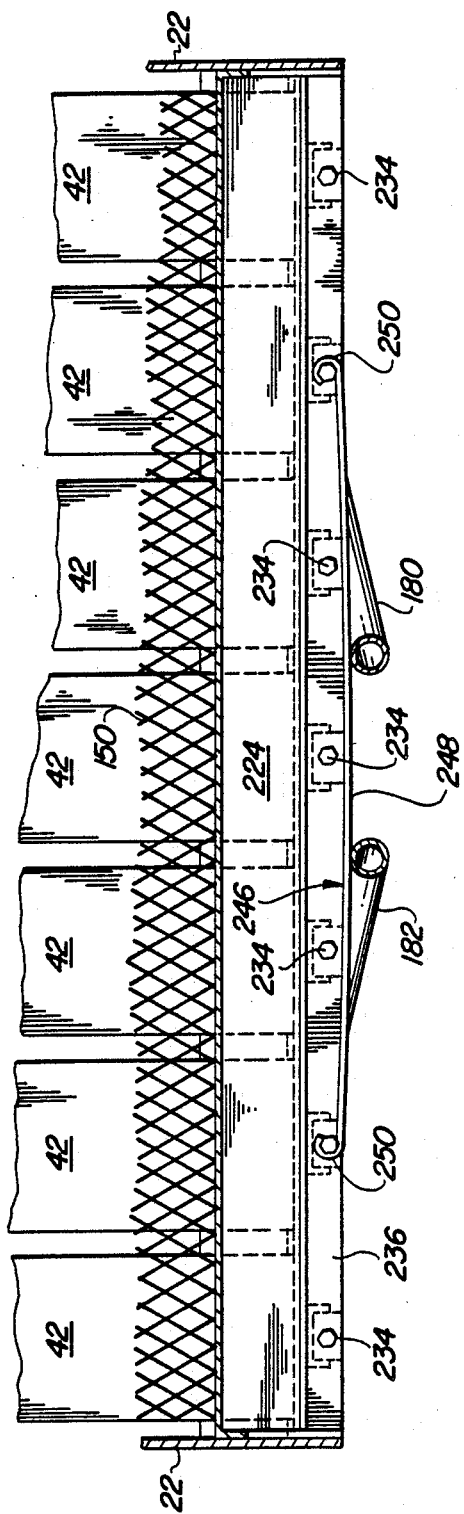
FIG. 5 is a view taken along line 5—5 of FIG. 2 showing the mounting of a leaf spring which biases a guide member of the guide structure against the bottoms of the bale-forming belts.

A wrap material guide assembly 172 is provided for guiding wrap material, exiting from the feed rolls 144 and 146, beneath the discharge gate 20 and into the bale chamber inlet 46. Specifically, referring now also to FIGS. 3-6, it can be seen that the wrap material guide assembly 172 includes a support frame 174 comprising parallel rear and front tubular cross members 176 and 178, respectively, interconnected by right and left fore-and-aft extending tubes 180 and 182, respectively. The rear cross member 176 is square in cross section and has right and left clevises 184 and 186, respectively located on opposite sides of and adjacent to the center of the length thereof. The tubes 180 and 182 are circular in cross section and have their rear ends respectively received in and coupled to the clevises 184 and 186 by upright nut and bolt assemblies 188. The tubes 180 and 182 diverge forwardly and are respectively provided with transverse mounting plates 190 and 192 that are bolted to the front cross member 178 by fore-and-aft nut and bolt assemblies 194. The rear end of the frame 174 is pivotally mounted to a central bottom location of the wrapping mechanism support frame sidewalls 104 by a pair of tabs 196 respectively welded to upper opposite end portions of the rear cross member 176 and coaxially aligned horizontal pins 198 respectively projecting transversely through the tabs 196 and sidewalls 104. The forward end of the frame 174 is mounted to a belt guide structure 200 that is fixed to the opposite gate sidewalls 22 at respective areas just rearwardly of the lower front belt support roll 40. Specifically, the belt guide structure 200 includes a U-shaped belt guide support member 202 comprising a central transverse section 204 having depending legs 206 (FIG. 4) integral with opposite ends thereof and respectively bolted to the opposite sidewalls 22 by sets of upper and lower nut and bolt assemblies 208. Spaced evenly across and depending from the transverse section 204 are a plurality of belt guide straps 210 that have rounded bottoms 212 received centrally within respective gaps defined between adjacent ones of the belts 42 when the latter are evenly spaced across the baler. The lower ends of the opposite legs 206 are defined by out-turned tabs 216 which respectively overlie similar out-turned tabs 218 provided at the opposite ends of the front cross member 178 and an upright nut and bolt assembly 220 clamps together each of the overlying tabs 216 and 218. The frame 174 supports a wrap material guide member 222 having a rear portion defined by a transverse panel 224 including a smooth upper surface 226 having a forward portion positioned against a length of the belts 42 located adjacent the lower rear belt support roll 38 and having a rearward portion angled slightly upwardly from the forward portion and located to intercept a leading end of the length of wrap material 150, as the material is being fed by the rolls 144 and 146 at the initiation of each wrapping cycle, and direct the leading end into a pinch point 228 defined between the belts 42 and the panel surface 226. The guide member 222 further includes a plurality of longitudinally extending guide slats or members 230 respectively positioned beneath and having smooth guide surfaces 232 engaged with the longitudinal central area of the belts 42. The width of each of the slats 230 is only about one-third that of one of the belts 42. The slats 230 are each formed by a channel member having relatively short, downwardly extending legs and each has a downturned tab 233 at its rear end which is bolted, as by a nut and bolt assembly 234, to a downwardly directed leg of an angle member 236 extending transversely beneath and fixed, as by welding, to a forward underside location of the guide panel 224 which is parallel to and spaced rearwardly of a forward edge 238 of the panel. The downwardly extending legs of each of the slats 230 are notched with the front cross member 178 of the frame 174 being received in the notch. A pair of tabs 240 are fixed to each of the slats 230 so as to be on opposite sides of the cross member 178 and a nut and bolt assembly 242 fixes the cross member to the tabs. It is here noted that the nut and bolt assemblies 194 used to secure the mounting plates 190 and 192 to the cross member 178 preferably take the place of four of the nut and bolt assemblies 242 that would otherwise be used, this double usage being made possible by matching the mounting holes of the plates 190 and 192 with the holes provided in the tabs 240 of adjacent slats 230. For the purpose of guiding wrap material into the inlet 46 of the bale-forming chamber 44, a forward end portion 244 of each of the guide slats 230 is curved arcuately about a lower portion of the lower front belt support roll 40. The guide member 222 is biased upwardly to maintain the plurality of slats 230 respectively in contact with the underside of the plurality of belts 42 by means of a leaf spring 246 disposed centrally beneath the forward end portion of the panel 224, having a downwardly bowed central portion 248 resting on the frame tubes 180 and 182 and having connection eyes 250 at its opposite ends which are mounted to the angle member 236 by fore-and-aft extending nut and bolt assemblies 252. Preferably the length of the spring 246 is such that the nut and bolt assemblies 252 can take the place of a pair of the nut and bolt assemblies 234 that are used to secure the tabs 233 at the rear ends of the slats 230 to the angle member 236. Referring now to FIG. 7, it can be seen that the right end of the belt support roll 38 is mounted to the gate sidewall 22 by a U-shaped bracket 254 containing a vertical adjustment slot 256 through which a stud bolt 258 extends, the bolt 258 being threaded into a fixed core member (not shown) of the roll 38 on the opposite ends of which bearings are mounted for rotatably supporting the outer cylindrical portion of the roll. A similar mounting is provided for the left end of the roll 38. The adjustability of the roll ends makes it possible to maintain proper tracking of that run of the belts 42 which extends between the rolls 38 and 40, as will be explained below. The operation of the wrap material guide assembly 172 is briefly as follows. Assuming a bale has been formed to a desired diameter within the chamber 44 and it is desired to envelop the bale with wrap material, the wrapping cycle is either manually or automatically initiated by operation of the cylinder 170 to cock the knife assembly 164 and at the same time tighten the drive belt 156 so that the rotation of the roll 38 is transferred to the feed roll 144. Up to this point, an end of the length of wrap material 150 was merely dangling in a zone forwardly of the feed rolls 144 and 146. However, once the roll 144 begins to drive, the wrap material is fed through the rolls 144 and 146 and propelled into contact with the smooth upper surface 226 of the guide panel 224. The leading end of the wrap material is thus directed into the pinch point 228 between the bale-forming belts 42 and the panel 224 whereupon the belts engage the wrap material and carry it along the upper surfaces 232 of the slats 230, with the arcuately curved forward end portions 244 of the slats serving to turn the wrap material into the bale chamber inlet 46 where the wrap becomes caught between the formed bale and the belts 42 so as to become wrapped about the bale as the latter is rotated in the chamber 44 by the belts. It is here noted that the rounded ends 212 of the belt guide straps 210 permit the wrap material to pass therebeneath without being snagged and torn. Once a desired amount of material is wrapped on the bale, the cylinder 170 is again actuated so as to release the knife assembly 164 from the latch mechanism 168 whereupon the spring 162 acts to swing the knife assembly counterclockwise to cut the wrap material at a location between the feed rolls 144 and 146 and the pinch point 228, the spring also acting to move the idler arm 158 so as to slacken the drive belt 156 so as to stop the feeding of wrap material.

In the event any pieces of crop or foreign matter falls onto the panel 224 or the slats 230 such material will either merely fall off the sides or the ends of the slats 230 and to the ground and thus will not accumulate so as to impede the movement of the wrap material along the guide member 222. In the event the movement of wrap material along the guide member 222 does somehow become impeded resulting in the material bunching on the guide member 222, the nut and bolt assemblies 220 may be removed so as to permit the frame 174 to pivot downwardly about the axially aligned pins 198 to the dashed line position shown in FIG. 1 so as to move the guide member 222 away from the belts 42 and permit the bunched material to be removed along with any obstacle which caused the bunching.

Should an operator desire to check whether or not the run of belts extending between the rolls 38 and 40 is tracking properly, he need only to place the baler 10 on a level surface, engage and operate the drive for the belts 42 to drive the belts slowly and position himself at the rear of the gate 20 such that he may observe how the belts are tracking relative to the guide straps 210 of the belt guide structure 200. If the belts are tracking towards the left, i.e., crowding the right faces of the guide straps 210, this condition may be remedied, after first releasing belt tension by lifting the arms 54 through operation of the actuator 76 and discontinuing the drive to the belts 42, by loosening the stud bolt 258 at the right side of the baler and raising the roller 38 and re-tightening the bolt 258. If after rechecking the tracking, the belts still continue to track toward the right and the right bolt 258 is in the top of the slot 256, then the bolt 258 at the left end of the roll 38 may be loosened, the left end of the roll lowered and the left bolt 258 re-tightened. Leftward tracking of the belts 42 can similarly be remedied except in this case the left end of the roll 38 is adjusted upwardly and, if necessary, the right end is adjusted downwardly.

We claim:

1. In a large round baler including a bale discharge gate, lower rear and lower front bale-forming belt support rolls rotatably supported in opposite sidewalls of the gate, a plurality of bale-forming belts, each having longitudinally extending edges, the belts being supported in spaced side-by-side relationship to each other across and having a run extending between the lower rear and front bale-forming belt support rolls, a wrap material guide assembly mounted to the gate for guiding wrap material from a location adjacent the lower rear roll to a location adjacent the lower front roll, the improvement comprising: said wrap material guide assembly including a wrap material guide member having a rear end portion defined by a guide panel spanning the width of the gate and being supported in underlying relationship to the rear roll, a front cross member extending parallel to the panel and being mounted to the gate in underlying relationship to the plurality of belts at a location spaced just rearwardly of said lower front roll; and an elongate wrap material guide slat being positioned beneath each belt and between the edges of the latter and having a smooth upper surface at least in very close proximity to each belt run and having its opposite ends respectively fixed to the panel and to the cross member.

2. The large round baler defined in claim 1 wherein each material guide slat is formed from a downwardly opening channel member.

3. The large round baler defined in claim 1 or 2 wherein the cross member is in the form of a tube.

4. In a large round baler including a bale discharge gate, lower rear and lower front bale-forming belt support rolls rotatably supported in opposite sidewalls of the gate, a plurality of bale-forming belts, each having a pair of longitudinally extending edges, the belts being supported in spaced side-by-side relationship to each other across and having a run extending between the lower rear and front bale-forming belt support rolls, a wrap material guide assembly mounted to and positioned beneath the gate for guiding wrap material from a location adjacent the lower rear roll to a location adjacent the lower front roll, the improvement comprising: said wrap material guide assembly being substantially rectangular in plan view, having a width approximately equal to that of the gate and having a length slightly greater than the distance between the lower rear and front rolls; said wrap material guide assembly including a plurality of longitudinally extending slats located in spaced parallel relationship to each other respectively beneath the plurality of bale-forming belts with each slat being located between the pair of edges of a respective one of the belts; said slats having rear ends fixed to a panel disposed beneath the lower rear roll and having forward ends curved about a lower portion of the lower front roll; and said slats each having an upper wrap material guide surface extending the length thereof and being in substantial engagement with the respective one of the belts.

5. The large round baler defined in claim 4 wherein said slats are in the form of downwardly opening channel members.

6. The large round baler defined in claim 4 wherein said wrap material guide assembly includes a frame comprising parallel rear and front, transversely extending cross members respectively located rearwardly of the lower rear and front bale-forming belt support rolls and being interconnected by fore-and-aft extending frame member means and said slats extending above and being fixed to said front transversely extending cross member.

7. The large round baler defined in claim 6 and further including spring means disposed between the panel and said frame member means for biasing the panel and slats upwardly against the belt runs.

8. The large round baler defined in claim 7 wherein said spring means is a leaf spring.

9. The large round baler defined in claim 6 wherein said frame member means comprises a pair of forwardly diverging tubes.

10. The large round baler defined in claims 1 or 6 and further including a U-shaped belt guide structure having a transverse portion extending between the opposite sidewalls of the gate and having its opposite ends joined to respective legs that are fixed to the sidewalls at a location above the belt runs and behind the lower front roll; said guide structure including a plurality of guide straps depending from said transverse portion and having lower ends respectively positioned in gaps defined between adjacent ones of the belt runs; said opposite legs having bottoms defined by out-turned tabs; and said front cross member extending transversely beneath said belt runs and having opposite ends respectively connected to said out-turned tabs.

11. The large round baler defined in claim 6 wherein said rear cross member is mounted for pivoting about a horizontal transverse axis and said front cross member is releasably mounted to the gate whereby the guide assembly can be lowered about said axis once the front cross member is released from the gate.

12. The large round baler defined in claims 1 or 6 and further including a belt guide structure extending between and fixed to the gate sidewalls at a location just rearwardly of the lower front roll and including a plurality of guide elements respectively located in gaps defined by adjacent ones of the belts runs; and means vertically adjustably supporting the opposite ends of said lower rear roll to the opposite sidewalls of the gate whereby an operator positioned at the rear of the gate can look between the slats of the guide assembly to observe the tracking of the belt runs and make corrective adjustments to the lower rear roll if necessary.

13. The large round baler defined in claim 10 wherein lower ends of each of the belt guide straps are rounded so as to not snag wrap material moving therebeneath during wrapping of a bale.

* * * * *